United States Patent [19]

Hikes

[11] Patent Number: 5,341,900
[45] Date of Patent: Aug. 30, 1994

[54] OPEN GEAR SET LUBRICATION SYSTEM
[75] Inventor: Dale J. Hikes, Gettysburg, Pa.
[73] Assignee: Mobil Oil Corporation, Fairfax, Va.
[21] Appl. No.: 991,889
[22] Filed: Dec. 18, 1992

Related U.S. Application Data

[63] Continuation-in-part of Ser. No. 797,845, Nov. 26, 1991.
[51] Int. Cl.$^5$ .............................................. F01M 9/00
[52] U.S. Cl. ........................................ 184/6.12; 184/6.3; 184/6.4; 184/6.22; 184/6.25; 184/104.1; 184/103.2
[58] Field of Search ......................... 184/6.3, 6.4, 6.12, 184/6.22, 6.25, 6.24, 103.1, 103.2, 104.1; 74/478, 468

[56] References Cited

U.S. PATENT DOCUMENTS

| | | |
|---|---|---|
| 1,334,844 | 3/1920 | Day . |
| 1,429,466 | 9/1932 | Turnbull . |
| 2,237,253 | 4/1941 | Rosnell et al. . |
| 2,441,681 | 5/1948 | Werder . |
| 2,535,703 | 12/1950 | Smith et al. . |
| 2,622,699 | 12/1952 | Mills . |
| 3,270,836 | 9/1966 | Rickley ................................ 184/6.4 |
| 3,286,791 | 11/1966 | Cofer et al. ....................... 184/104.1 |
| 3,416,633 | 12/1968 | Swearingen . |
| 4,105,092 | 8/1978 | Zeidler et al. ..................... 184/6.4 |
| 4,169,519 | 10/1979 | Hirt et al. ........................... 184/6.12 |
| 4,278,711 | 7/1981 | Sullivan . |
| 4,667,774 | 5/1987 | Roberge ............................. 184/6.12 |
| 4,839,041 | 6/1989 | Duwayama et al. . |
| 4,844,202 | 7/1989 | Maresko . |
| 4,976,335 | 12/1990 | Cappellato ......................... 184/6.4 |

FOREIGN PATENT DOCUMENTS

| | | | |
|---|---|---|---|
| 86618 | 8/1919 | Switzerland ................. 184/6.12 |
| 0150101 | 9/1920 | United Kingdom .......... 184/6.25 |
| 254228 | 7/1926 | United Kingdom .......... 184/6.12 |

Primary Examiner—Thomas E. Denion
Attorney, Agent, or Firm—Alexander J. McKillop; George W. Hager, Jr.; Michael J. Mlotkowski

[57] ABSTRACT

A recirculatory lubrication system for applying a film of lubricant to an open gear set having a pinion gear and a bull gear in meshing engagement with the pinion gear, the open gear set at least substantially enclosed by a gear set cover having a lower portion for collecting lubricant therein. The lubrication system includes a lubricant reservoir, a lubricant supply line, having a first end in fluid communication with the supply port of the reservoir, a lubricant distribution header having a first end of in fluid communication with the second end of the supply line, the header having a plurality of lubricant feed orifices positioned along the length of the header, the feed orifices effective in applying the film of lubricant onto the gear set, a first lubricant return line having a first end in fluid communication with the lower portion of the gear set cover, a filter assembly, having an inlet and an outlet, the inlet of the filter assembly in fluid communication with the second end of the first lubricant return line, the filter assembly having at least one filter element positioned therein for removing particles entrained in the lubricant and a second lubricant return line having a first end in fluid communication with the outlet of the filter assembly and a second end in fluid communication with the lubricant return port of the reservoir.

11 Claims, 5 Drawing Sheets

5,341,900

OPEN GEAR SET LUBRICATION SYSTEM

RELATED APPLICATIONS

This is a continuation-in-part of application Ser. No. 07/797,845, filed on Nov. 26, 1991, now abandoned.

FIELD OF THE INVENTION

The present invention relates to a system for the lubrication of an open gear set and, more particularly, to a lubrication system which permits the lubricant to be recirculated and reused.

BACKGROUND OF THE INVENTION

In the mechanical transmission of power, large open gear sets are frequently employed, particularly in plants having large mills, kilns and the like. Lubricants conventionally used for open gear sets generally possess good adhesive properties to assure that a film of lubricant is maintained on the contact surfaces of the gear teeth. In the usual case, to lubricate an open gear set, the lubricant is generally applied using a all-loss method.

At present, open gears are lubricated with heavy asphaltic lubricants which are applied continuously by a paddle wheel or periodically by a system known to those skilled in the art as a Farval system, usually once every 15 to 20 minutes. Although such systems are generally acceptable, a number of problems have surfaced in recent years. One such problem stems from the fact that most sprayed-on lubricants are diluted with a solvent. As may be appreciated, with today's heightened concern for the environment, the presence of such solvents necessitate that special handling procedures for waste lubricants be employed. From a lubrication standpoint, when premature evaporation of the solvent occurs, pumping problems are often encountered even before the lubricant is applied. Since presently employed open gear lubricants are all-loss materials, following their application, they become a hazardous waste material. Moreover, leaked or spilled open gear lubricants, due to their inherent tackiness, are difficult to clean up. In states where disposal is strictly regulated, the cost of proper disposal of used open gear lubricants may run in excess of $200,000, annually, for the average plant, and can be expected to increase in the future.

From a mechanical standpoint, much of the wear which occurs in open gear sets is caused by a combination of airborne abrasive dust and the present "feast-or-famine" method of periodic lubricant application. As can be appreciated by those skilled in the art, when lubricants are applied using a form of periodic application, the film so applied will usually vary from being somewhat excessive, just after application, to being somewhat inadequate, just prior to the next application.

Therefore what is needed is an open gear lubricating system which overcomes the aforementioned problems and, in particular, is acceptable to open gear builders, employs a lubricant which has recycle capability, negligible environmental impact, is cost effective, permits easy clean up, prevents gear wear and offers improved power transmission efficiency.

SUMMARY OF THE INVENTION

In accordance with the present invention, there is provided a recirculatory lubrication system for applying a film of lubricant to an open gear set having a pinion gear and a bull gear in meshing engagement with the pinion gear, the open gear set at least substantially enclosed by a gear set cover having a lower portion for collecting lubricant therein. The lubrication system includes a lubricant reservoir, a lubricant supply line, having a first end in fluid communication with the supply port of the reservoir, a lubricant distribution header having a first end of in fluid communication with the second end of the supply line, the header having a plurality of lubricant feed orifices positioned along the length of the header, the feed orifices effective in applying the film of lubricant onto the gear set, a first lubricant return line having a first end in fluid communication with the lower portion of the gear set cover, a filter assembly, having an inlet and an outlet, the inlet of the filter assembly in fluid communication with the second end of the first lubricant return line, the filter assembly having at least one filter element positioned therein for removing particles entrained in the lubricant and a second lubricant return line having a first end in fluid communication with the outlet of the filter assembly and a second end in fluid communication with the lubricant return port of the reservoir.

Also provided is a process for applying a film of lubricant to an open gear set having a pinion gear and a bull gear in meshing engagement with the pinion gear, the open gear set at least substantially enclosed by a gear set cover having a lower portion for collecting lubricant therein, including the steps of: (a) pumping the lubricant onto the open gear set, (b) collecting the lubricant pumped in step (a) as the lubricant drains from the open gear set to the lower portion of the gear set cover, (c) transferring the lubricant from the reservoir to a filter assembly, (d) filtering the lubricant transferred in step (c) to remove particles entrained in the lubricant, (e) transferring the filtered lubricant to a reservoir and (f) repeating steps (a) through (e) a plurality of times.

Therefore it is an object of the present invention to provide an lubrication system for use in open gear sets.

It is another object of the present invention to provide a recirculatory open gear lubrication system which minimizes the costs associated with the lubrication of open gear sets.

It is a further object of the present invention to provide an open gear lubrication system capable of reducing gear wear.

It is yet another object of the present invention to provide an open gear lubrication system which is capable of reducing power requirements.

It is a yet further object of the present invention to provide an open gear lubrication system which does not require the use of solvent diluted asphaltic lubricants.

Other objects and the several advantages of the present invention will become apparent to those skilled in the art upon a reading of the specification and the claims appended thereto.

BRIEF DESCRIPTION OF THE DRAWINGS

Reference may now be had to the following detailed description of exemplary embodiments of the inventive recirculatory lubrication system, taken in conjunction with the accompanying drawings, in which.

DETAILED DESCRIPTION OF THE INVENTION

The present invention is best understood by reference to the appended figures, which are given by way of example and not of limitation.

As will become more fully appreciated, the lubrication system of the present invention seeks to solve the problems associated with the use of traditional solvent-diluted asphaltic open gear lubricants and their all-loss methods of application. Advantageously, rather than employ a solvent-diluted asphaltic open gear lubricant, a low pour point, pure synthetic lubricant, containing no wax, solvents, black oils, or any other hazardous material, is used.

Figure 1:
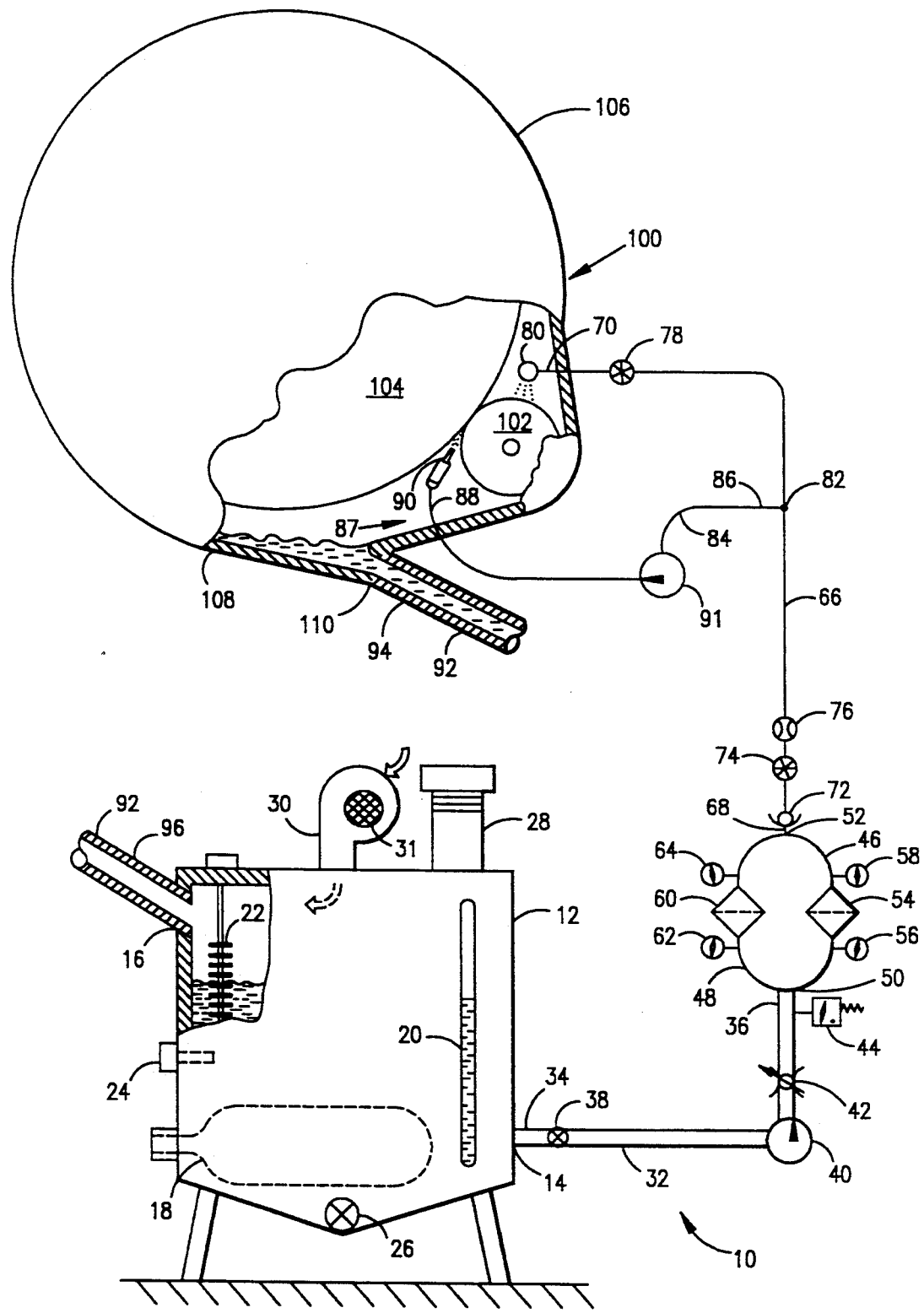
FIG. 1 presents, schematically, a system for lubricating an open gear set, in accordance with the present invention.

Referring now to FIG. 1, a schematic depiction of one embodiment of a system 10 for lubricating an open gear set, in accordance with the present invention, is presented. Open gear set 100 includes a pinion gear 102 and a bull gear 104 in meshing engagement with pinion gear 102. Open gear set 100 is shown to be enclosed by a gear set cover 106 which has a lower portion 108 for collecting lubricant therein. Lubricant reservoir 12 is used to assure that adequate supply of synthetic open gear lubricant is available during operation of the open gear set 100. In a typical plant installation, such as a mill or kiln operation employing open gear set 100, the open gear set 100 might be located on the shop floor, with reservoir 12 located in the basement below together with attendant hardware and controls, although other installation configurations are readily envisioned. Reservoir capacities within the range of from about 150 gallons to about 300 gallons are generally preferred, with a reservoir capacity of about 200 gallons being suitable for the typical open gear set system.

Lubricant reservoir 12 is shown in FIG. 1 to include lubricant supply port 14 and lubricant return port 16. Lubricant reservoir 12 may also be equipped with a reservoir sight glass 20 so that plant personnel may readily observe that an adequate supply of the synthetic open gear lubricant is present. Optionally, a low lubricant level alarm 24 may be installed in reservoir 12 and wired into a safety shut-down system or visual or audible alarm system (not shown) to further guard against operation in the absence of an adequate supply of lubricant. Also, to assure that the operational viscosity of the synthetic lubricant within reservoir 12 is controlled within an optimal range of values, thermostatically-controlled reservoir heater 18 is provided. A maximum watt density of 8 watts per square inch is preferred for reservoir heater 18. Controlling the temperature of reservoir 12 to about 100° F. has been found to provide a good level of operability in the practice of the present invention.

To aid in the periodic cleaning of reservoir 12, a 3-inch (or larger) ball valve drain 26 is provided. As a further aid in cleaning reservoir 12, large clean-out panels (not shown) can be fitted to each side of reservoir 12 to permit the easy removal of settled dust and debris. Reservoir 12 further includes a fill pipe 28, which may be fabricated from a 4-inch pipe fitting, as is preferred, to facilitate the pouring of relatively heavy synthetic lubricant into the reservoir. Fill pipe 28 should be at least 6 inches to 8 inches above the top of reservoir 12, so that any dust that settles on reservoir 12 will not cover the cap or threads of fill pipe 28. An alternate method of adding oil to reservoir 12 would be to use a quick-connect fitting (not shown) on the fill pipe 28 so that reservoir 12 would not require opening to a potentially dusty environment, permitting lubricant to be pumped from a drum into reservoir 12. In order to reduce the energy requirements of the system of the present invention, reservoir 12 may be insulated to reduce heat loss.

Connected to supply port 14 of reservoir 12 is a first lubricant supply line 32 having a first end 34 in fluid communication with supply port 14 and a second end 36. As is preferred, first lubricant supply line 32 is positioned at least 5 or six inches from the bottom of reservoir 12 to avoid picking up settled particulate material. Second end 36 of first lubricant supply line 32 is connected to filter assembly 46. As is preferred, filter assembly 46 includes a filter housing 48 having an inlet 50 and an outlet 52, inlet 50 being in fluid communication with second end 36 of first lubricant supply line 32. Filter housing 48 has at least one 10-micron filter element 54 positioned therein for removing particles entrained in the lubricant. Still more preferred is a dual filter assembly 46 having two 10-micron filter elements 54 and 60 positioned within filter housing 48. A dual filter assembly 46 is preferred as it permits filter elements to be changed without shutdown of the lubrication system and gear set. A particularly preferred dual full-flow 10-micron filter assembly is available from Parker Co. (Part No. DIL-2-2-10B-PM-35-YEYE-11). Gauges 56, 58, 62 and 64 may be mounted as shown in FIG. 1 so that filter pressure drops can be monitored.

Still referring to FIG. 1, first lubricant supply line 32 is shown having a pump 40 installed therein. Pump 40 is an air operated, double diaphragm pump, such a pump available from W. W. Grainger Company (Part No. 2P-348). Also installed within first lubricant supply line 32 is flow regulator 42, which may be set, as is preferred, to a rate on the order of about one gallon per minute. To provide a further measure of safety to the system and gear set which it lubricates, a pressure alarm 44 is fitted between pump 40 and filter assembly 46 to alert maintenance personnel that a filter element change is required.

A second lubricant supply line 66 having a first end 68 in fluid communication with outlet 52 of filter housing 48 is used to transfer lubricant to hollow elongated lubricant distribution header 80. Second lubricant supply line 66 is shown having two star wheel visual flow detectors 74 and 76 installed just after filter assembly 46 and just before lubricant distribution header 80, respectively. Also installed in second lubricant supply line 66 is magnetic flow detector 76 to alert operating personnel when lubricant flow is stopped for any reason. A check valve 68 is also provided to prevent the possibility that a reverse flow of lubricant could occur.

Figure 2:
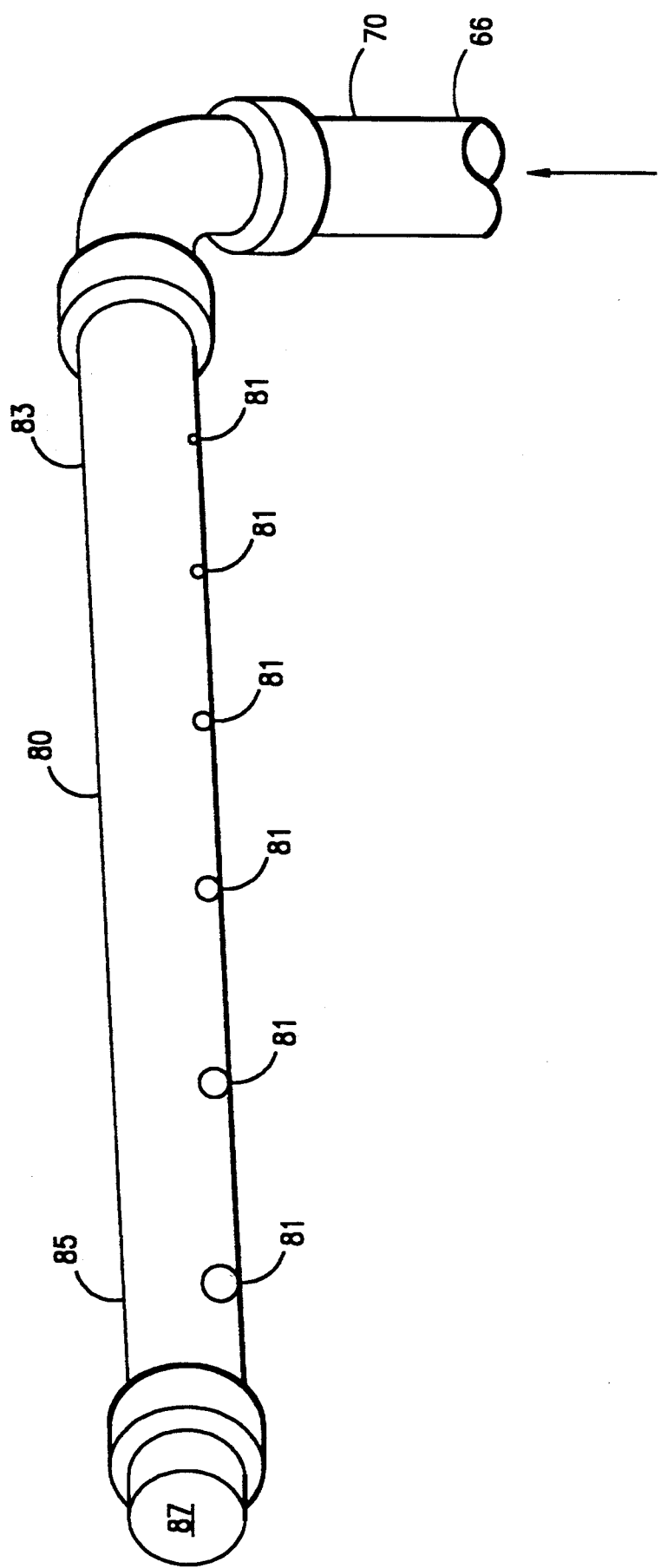
FIG. 2 presents a perspective view of a lubricant distribution header for use in the practice of the present invention.

One embodiment of a lubricant distribution header 80 is shown in a perspective view in FIG. 2. As indicated in FIG. 2, the second end 70 of second lubricant supply line 66 is connected to the first end 83 of lubrication distribution header 80 so as to in fluid communication therewith. Lubrication distribution header 80 has a plurality of lubricant feed orifices 81 positioned along the length of lubrication distribution header 80. Lubricant feed orifices 81 are sized and positioned to be effective in applying an even film of lubricant across pinion gear 102 for transfer to bull gear 104 during the meshing of the pinion and bull gears 102 and 104. Alternatively, as may be appreciated by those skilled in the art, lubricant feed orifices 81 may be positioned to apply a film of lubricant across bull gear 104 for transfer to pinion gear 102 during the meshing of the bull and pinion gears, 104 and 102 respectively. The second end 85 of lubrication distribution header 80 is shown to be sealed-off by plug 87. As shown, when viewed from first end 83 to second end 85 lubricant distribution header 80 employs a series of progressively larger feed orifices 81, although other designs have proven to be effective, as will be described below.

Referring again to FIG. 1, an optional auxiliary lubrication system 87 is shown. Auxiliary lubrication system 87 is advantageously employed for gear mesh lubrication at the initiation of gear set rotation (cold start-up). Auxiliary lubrication system 87 includes a third lubricant supply line 84 having a first end 86 in fluid communication with "tee" 82 of second lubricant supply line 66 and a second end 88 in fluid communication with a lubricant spray head 90, spray head 90 directed at the gear mesh formed by pinion gear 102 and bull gear 104. To assure that lubricant is supplied to lubricant spray head 90 under sufficient pressure, pump 91 is employed in the third lubricant supply line of the auxiliary lubrication system. As is preferred, pump 91 may be an air-operated pump, with air line filter-regulator-lubricator (Farval or equivalent) and the spray head 90 can be a commercially available Farval side-mounted spray head. Spray head 90, as is most preferred, is mounted on the gear cover at an angle effective to direct a lubricant spray across the gear mesh. This "pre-lube" auxiliary lubrication system is operated for 15 seconds prior to the start-up of the gear set, and for 30 seconds after start-up.

Lubricant is returned to reservoir 12 by lubricant return line 92. Lubricant return line 92 has a first end 94 in fluid communication with drain opening 110 of the lower portion 108 of gear set cover 106 and a second end 96 in fluid communication with lubricant return port 16 of reservoir 12.

To remove metallic chips which may have become entrained within the lubricant being returned to reservoir 12, an optional magnetic trap 22, such as is available from Kebby Company, can be mounted near return port 16 of reservoir 12. Magnetic trap 22 is also useful for the monitoring of gear wear rates by plant personnel.

To address the concern that airborne plant dust and debris will accumulate within the open gear lubricant as it is recirculated, a 60–100 cfm shaded pole blower 30 can be mounted above the lubricant level of reservoir 12, as depicted in FIG. 1. In operation, blower 30 pulls air through a fiber filter 31, pushing the air across the lubricant inside reservoir 12, up return line 92 to gear set cover 106, providing a prevailing air pressure inside gear cover 106 somewhat above ambient. This higher level of pressure will tend to push airborne dust out of seals and fittings, rather than allow dirt and dust free entry. Suitable shaded pole blowers are available from W. W. Grainger, Inc. Filter 31 should be changed every two weeks or as required. Operating experience may dictate the use of a small rotary lobe blower with an air filter system of appropriate size in place of the shaded pole blower.

Figure 3:
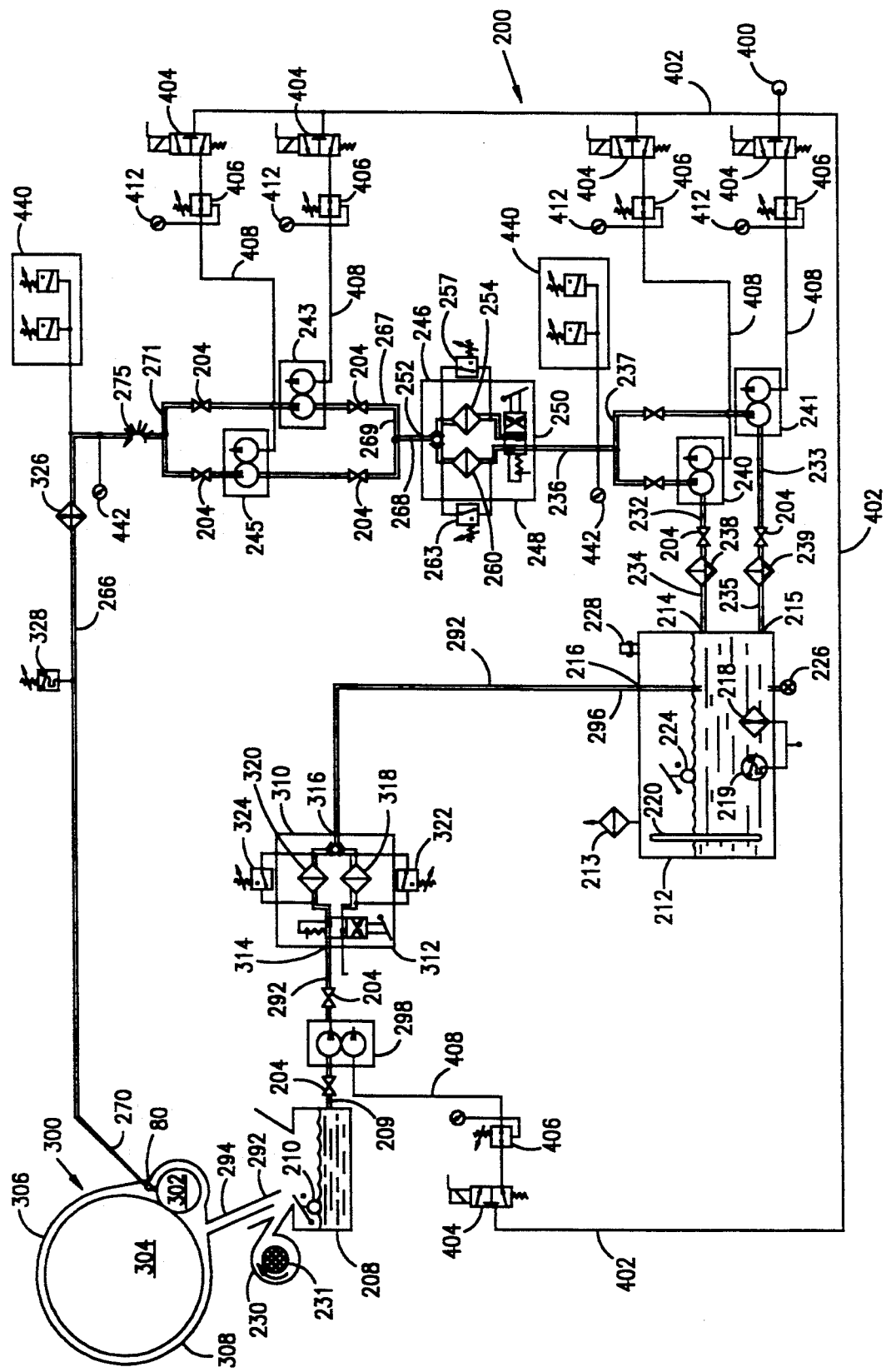
FIG. 3 presents a detailed schematic view of a system for lubricating an open gear set, including details of a preferred electro-pneumatic control system, in accordance with the present invention.

Referring now to FIG. 3, a schematic view of an enhanced system for lubricating an open gear set, including details of a preferred electro-pneumatic control system, is presented. Schematically represented open gear set 300 includes a pinion gear 302 and a bull gear 304 in meshing engagement with pinion gear 302. As with the embodiment described above, open gear set 300 is enclosed by a gear set cover 306 having a lower portion 308 for collecting lubricant therein.

Main lubricant reservoir 212, having a preferred capacity of from about 150 gallons to about 300 gallons, is shown to include a pair of lubricant supply ports 214 and 215 and a single lubricant return port 216. Main lubricant reservoir 212 also has a reservoir sight glass 220 so that plant personnel may readily observe that an adequate supply of the synthetic open gear lubricant is present. A low lubricant level alarm 224 is shown installed in reservoir 212 and wired into a safety shutdown system or visual or audible alarm system (not shown) to further guard against a shut-down in the absence of an adequate supply of lubricant. Also, to assure that the operational viscosity of the synthetic lubricant within reservoir 212 is controlled within an optimal range of values, thermostatically-controlled reservoir heater 218 is provided. Again, a maximum watt density of 8 watts per square inch is preferred for reservoir heater 218. The temperature of the lubricant within main reservoir 212 is controlled to about 100° F., although other temperatures may be acceptable in view of the viscosity characteristics of the particular lubricant employed.

To aid in the periodic cleaning of main reservoir 212, a 3-inch (or larger) ball valve drain 226 is provided. Main reservoir 212 also includes a fill pipe 228, which may be fabricated from a 4-inch pipe fitting, as is preferred, to facilitate the pouring of the relatively heavy synthetic lubricant into the reservoir. As described for the embodiment of FIG. 1, an alternate method of adding oil to main reservoir 212 would be to use a quick-connect fitting (not shown) on fill pipe 228 so that the reservoir 212 would not require opening to a potentially dusty environment, thus permitting lubricant to be pumped from a drum into main reservoir 212. To reduce the energy requirements of the system of the present invention, main reservoir 212 may be insulated to reduce heat loss.

In the FIG. 3 embodiment of the present invention, connected to supply ports 214 and 215 of main reservoir 212 are a a pair of first lubricant supply lines 232 and 233, respectively, having first ends 234 and 235 in fluid communication with supply ports 214 and 215. Each of first lubricant supply lines 232 and 233 have second ends 236 and 237, respectively. As is preferred, first lubricant supply lines 232 and 233 are positioned off the bottom of main reservoir 212 to limit the picking up of settled particulate material. Second end 236 of first lubricant supply line 232 is connected to filter assembly 246. While second end 237 is shown to be connected to first lubricant supply line 232 at a "tee" juncture ahead of second end 236 of first lubricant supply line 232, the actual positioning is not critical and may terminate at filter assembly 246. As is preferred, filter assembly 246 includes a filter housing 248 having an inlet 250 and an outlet 252, inlet 250 being in fluid communication with second end 236 of first lubricant supply line 232 and second end 237 of first lubricant supply line 233. Filter housing 248 is shown having a pair of 10-micron filter elements 254 and 260 positioned therein for removing particles entrained in the lubricant. A dual filter assembly 246 is preferred as it permits filter elements to be changed without shutdown of the lubrication system and gear set. A particularly preferred dual full-flow 10-micron filter assembly is available from Parker Co. (Part No. DIL2-2-10B-PM-35-YEYE-11). Optional differential pressure switches 257 and 263 may be mounted as shown in FIG. 3 and wired to an alarm or safety shut-down in the event that a filter becomes plugged.

Still referring to FIG. 3, first lubricant supply lines 232 and 233 are shown having a pumps 240 and 241 installed respectively therein. As is preferred, pumps 240 and 241 are air operated, double diaphragm pumps, with a particularly preferred pump being one available from Stewart-Warner Alemite Corporation (Part No. 7061D-5-I). Pumps 240 and 241 are controlled by air operated solenoid valves 404 and air regulators 406, the source of air to valves 404 and regulators 406 supplied by air line 402. The regulated air is then fed to pumps 240 and 241 by air lines 408. Pressure gauges 412 are placed in air lines 408 for periodic monitoring by plant personnel. In addition, to provide a further measure of safety to the system and to the gear set which it lubricates, a high-low pressure alarm 440 is fitted before filter assembly 246 to alert maintenance personnel when a filter element change is required.

A second lubricant supply line 266 having a first end 268 in fluid communication with outlet 252 of filter housing 248 is used to pump lubricant to hollow elongated lubricant distribution header 280. Second lubricant supply line 266 is shown having a pump 245 installed after filter assembly 246. Also installed within second lubricant supply line 266 is parallel supply line 267 having a first end in fluid communication with first end 268 of second lubricant supply line 266 and a second end 271 in fluid communication with second lubricant supply line 266 just before lubricant flow regulator 275, which may be set, as is preferred, to a rate on the order of about one gallon per minute. Parallel supply line 267 has installed therein pump 243. Pumps 243 and 245, once again are air operated, double diaphragm pumps, with the particularly preferred pumps being available from Stewart-Warner Alemite Corporation (Part No. 7061D-5-I). Pumps 243 and 245 are controlled by air operated solenoid valves 404 and air regulators 406, the source of air to valves 404 and regulators 406 supplied by air line 402. The regulated air is then fed to pumps 243 and 245 by air lines 408. Pressure gauges 412 are used in air lines 408 for periodic monitoring by plant personnel. Again, to provide a further measure of safety to the system and gear set which it lubricates, a high-low pressure alarm 440 is employed, this one installed after lubricant flow regulator 275.

To prevent against excessive heat loss, the second lubricant supply line 266 may be wrapped with conventional heat tape 326. Temperature indicator/controller 328 can be employed to monitor and maintain the temperature of the lubricant flowing within second lubricant supply line 266. The second end 270 of second lubricant supply line 266 is connected to lubricant distribution header 80, so as to be in fluid communication therewith.

Lubricant is returned to main reservoir 212 by lubricant return line 292. Lubricant return line 292 has a first end 294 in fluid communication with the lower portion 308 of gear set cover 306 and a second end 296 in fluid communication with lubricant return port 216 of main reservoir 212.

In a particularly preferred embodiment, a recovery reservoir 208 can be provided in lubricant return line 292 to serve as a catch tank for lubricant draining back from the lower portion 308 of gear set cover 306. Secondary reservoir 208 can be sized within the range of about 20 to about 100 gallons, with a size of about 40 gallons being most preferred. Optionally, a low lubricant level alarm 210 can be installed in recovery reservoir 208 and wired into a safety shut-down system or visual or audible alarm system (not shown). Secondary reservoir 208 is provided with a supply port 209 to which lubricant return line 292 is connected thereto. Lubricant return line 292 is shown having a pump 298 installed after supply port 209 of recovery reservoir 208. Again, pump 298 is an air operated, double diaphragm pump, such as Stewart-Warner Alemite Part No. 7061D-5-I. Pump 298 is controlled by air operated solenoid valve 404 and air regulator 406, the source of air supplied by air line 402. The regulated air is then fed to pump 298 by air line 408. Pressure gauge 412 is used in air line 408 for periodic monitoring by plant personnel. Also installed in lubricant return line 292, after pump 298 is filter assembly 310. Filter assembly 310 includes a filter housing 312 having an inlet 314 and an outlet 316. Filter housing 312 is shown having a pair of 10-micron filter elements 318 and 320 positioned therein for removing particles entrained in the lubricant being returned to main reservoir 212. A dual filter assembly 310 is preferred as it permits filter elements to be changed without shutdown of the lubrication system and gear set. The particularly preferred filter assembly, once again, is the dual full-flow 10-micron assembly available from Parker Co. (Part No. DIL2-2-10B-PM-35-YEYE-11). Optional differential pressure switches 322 and 324 may be mounted as shown in FIG. 3 and wired to an alarm or safety shut-down in the event that a filter becomes plugged.

To address the concern that airborne plant dust and debris will accumulate within the open gear lubricant as it is recirculated, a 60-100 cfm shaded pole blower 230 can be mounted above the lubricant level of recovery reservoir 208, as depicted in FIG. 3. In operation, blower 230 pulls air through a fiber filter 231, pushing the air across the lubricant inside recovery () reservoir 208, up return line 292 to gear set cover 306, providing a prevailing air pressure inside gear cover 306 somewhat above ambient. As mentioned above, this higher level of pressure will tend to push airborne dust out of seals and fittings, rather than allow dirt and dust free entry. Suitable shaded pole blowers are available from W. W. Grainget, Inc. Optionally, a rotary lobe blower with an air filter system of appropriate size can be used in place of the shaded pole blower.

As shown in FIG. 3, a plurality of flow check valves 204 are utilized at several positions within the system of FIG. 3 to prevent the undesirable back flow of lubricant which could otherwise occur at those locations.

Figure 4:
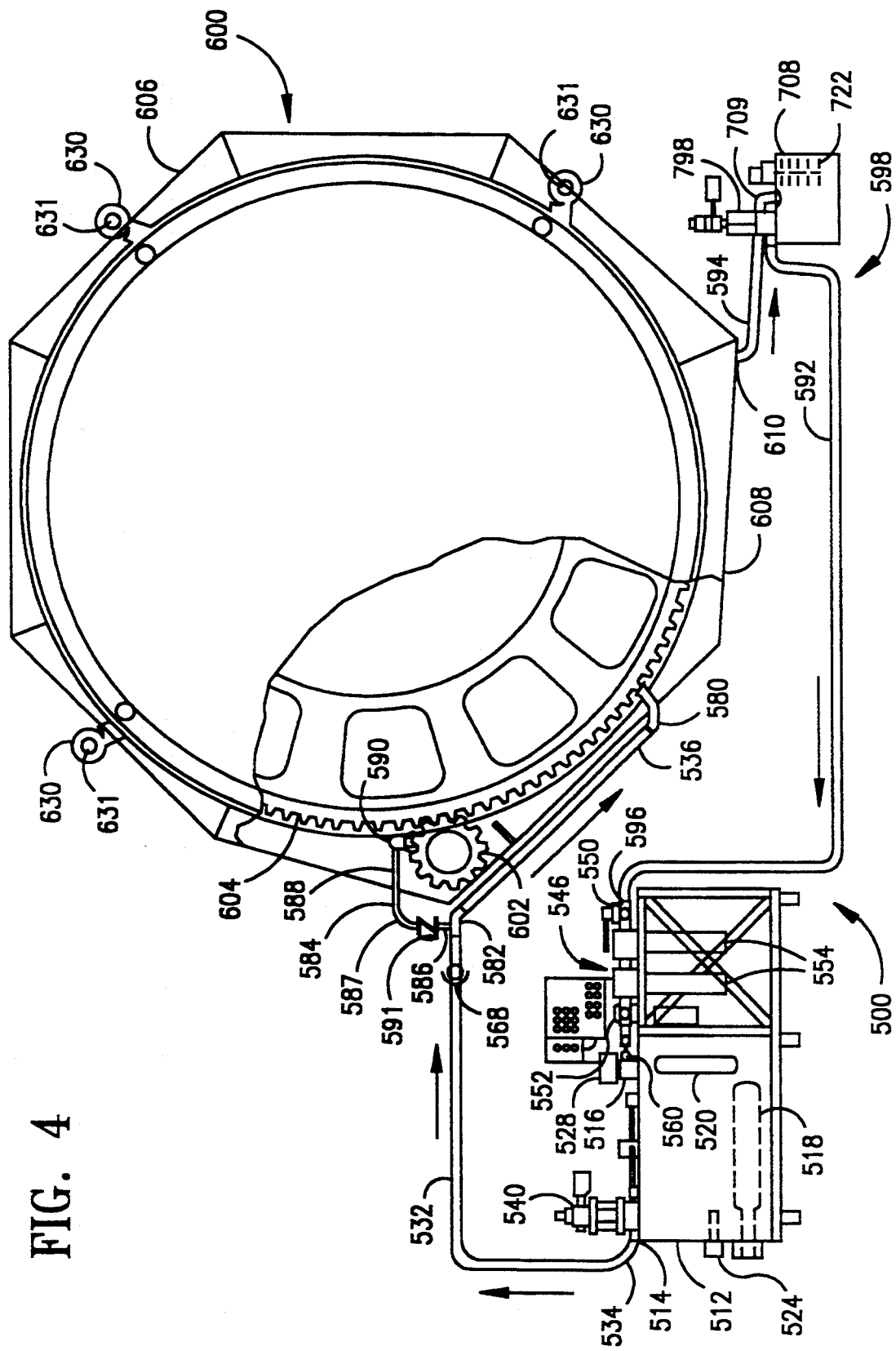
FIG. 4 presents, schematically, another embodiment of a system for lubricating an open gear set, in accordance with the present invention.

Referring now to FIG. 4, a schematic depiction of another embodiment of a system 500 for lubricating an open gear set, in accordance with the present invention, is shown. Open gear set 600 includes a pinion gear 602 and a bull gear 604 in meshing engagement with pinion gear 602. Open gear set 600 is shown to be enclosed by a gear set cover 606 which has a lower portion 608 for collecting lubricant therein. Lubricant reservoir 512 is used to assure that adequate supply of synthetic open gear lubricant is available during operation of the open gear set 600. As stated above, in a typical plant installation, the open gear set 600 might be located on the shop floor, with reservoir 512 located in the basement below together with attendant hardware and controls. Again, reservoir capacities within the range of from about 150 gallons to about 300 gallons are generally preferred, with a reservoir capacity of about 200 gallons being suitable for the typical open gear set system.

Lubricant reservoir 512 is shown in FIG. 4 to include lubricant supply port 514 and lubricant return port 516. Lubricant reservoir 512 may also be equipped with a reservoir sight glass 520 so that plant personnel may readily observe that an adequate supply of the synthetic open gear lubricant is present. A low lubricant level alarm 524 may also be installed in reservoir 512 and wired into a safety shut-down system or visual or audible alarm system (not shown) to further guard against operation in the absence of an adequate supply of lubricant. Again, to assure that the operational viscosity of the synthetic lubricant within reservoir 512 is controlled within an optimal range of values, thermostatically-controlled reservoir heater 518 is provided. A maximum watt density of 8 watts per square inch is preferred for reservoir heater 518. Controlling the temperature of reservoir 512 to about 100° F. has been found to provide a good level of operability in the practice of the present invention.

To clean reservoir 512, a 3-inch, or larger, ball valve drain can be provided. Reservoir 512 further includes a fill cap 528 to facilitate the pouring of the relatively heavy synthetic lubricant into the reservoir. An alternate method of adding oil to reservoir 512 would be to use a quick-connect fitting (not shown) on the fill cap 528 so that reservoir 512 would not require opening to a potentially dusty environment, permitting lubricant to be pumped from a drum into reservoir 512. In order to reduce the energy requirements of the system of the present invention, reservoir 512 may also be insulated to reduce heat loss.

Connected to supply port 514 of reservoir 512 is lubricant supply line 532 having a first end 534 in fluid communication with supply port 514 and a second end 536, the second end 536 connected to hollow elongated lubricant distribution header 580. As discussed above, the lubricant supply line may also include, as is preferred, star wheel visual flow detectors (not shown) installed therein, just before lubricant distribution header 580. A magnetic flow detector (not shown) may also be employed to alert operating personnel when lubricant flow is stopped for any reason. A check valve 568 is also provided to prevent the possibility that a reverse flow of lubricant could occur.

Figure 5:
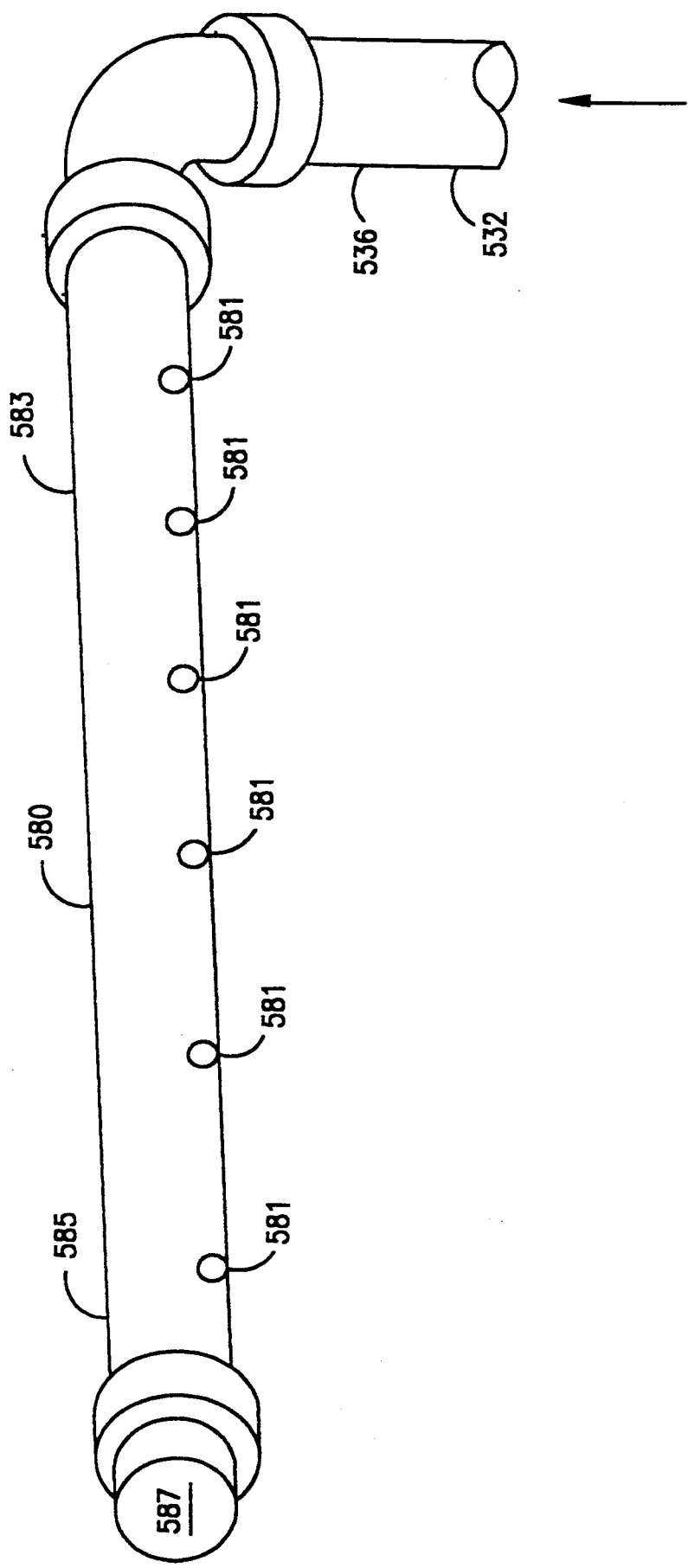
FIG. 5 presents another embodiment of a lubricant distribution header for use in the practice of the present invention.

A particularly preferred lubricant distribution header 580 is shown in a perspective view in FIG. 5. As indicated in FIG. 4, the second end 536 of lubricant supply line 532 is connected to the first end 583 of lubrication distribution header 580 so as to in fluid communication therewith. Lubrication distribution header 580 has a plurality of lubricant feed orifices 581 positioned along the length of lubrication distribution header 580. Lubricant feed orifices 81 are sized and positioned to be effective in applying an even film of lubricant across bull gear 504 for transfer to pinion gear 502 during the meshing of the pinion and bull gears 502 and 504. Alternatively, as may be appreciated by those skilled in the art, lubricant feed orifices 581 may be positioned to apply a film of lubricant across pinion gear 502 for transfer to bull gear 504 during the meshing of the bull and pinion gears, 504 and 502, respectively. The second end 585 of lubrication distribution header 580 is shown to be sealed-off by plug 587. As is shown, lubricant distribution header 580 employs a series of equally sized feed orifices 581.

Again referring to FIG. 4, lubricant supply line 532 is shown having a pump 540 installed therein. While an air operated, double diaphragm pump may be employed, as described above, such a pump available from W. W. Grainget Company (Part No. 2P-348), it has been found that superior results are obtained when using a high pressure, (500–600 psi) screw-type pump, such as may be obtained from IMO. Pump speeds of about 600 rpm are typical for such a pump to provide the requisite flows (about one gallon per minute) and pressures.

Still referring to FIG. 4, an optional auxiliary lubrication system 87 is shown. Auxiliary lubrication system 587 is advantageously employed for gear mesh lubrication at the initiation of gear set rotation (cold start-up). Auxiliary lubrication system 587 includes an auxiliary lubricant supply line 584 having a first end 586 in fluid communication with "tee" 582 of lubricant supply line 532 and a second end 588 in fluid communication with a lubricant spray head 590, spray head 590 directed at the gear mesh formed by pinion gear 502 and bull gear 504. To assure that lubricant is supplied to lubricant spray head 590 under sufficient pressure, pump 591 is employed in the auxiliary lubricant supply line of the auxiliary lubrication system. As is preferred, pump 591 may be an air-operated pump, with air line filter-regulator-lubricator (Farval or equivalent), or another screw-type pump (IMO or equivalent) and the spray head 590 can be a commercially available Farval side-mounted spray head. Spray head 590, as is most preferred, is mounted on the gear cover at an angle effective to direct a lubricant spray across the gear mesh. This "pre-lube" auxiliary lubrication system is operated for 15 seconds prior to the start-up of the gear set, and for 30 seconds after start-up.

Lubricant is returned to reservoir 512 by a lubricant return system 598. Lubricant return system 598 includes first lubricant return line 592 which has a first end 594 in fluid communication with drain opening 610 of the lower portion 608 of gear set cover 606 and a second end 596 in fluid communication with filter assembly 546. As is preferred, filter assembly 546 includes an inlet 550 and an outlet 552, inlet 550 being in fluid communication with second end 596 of first lubricant return line 592. Filter assembly 546 has at least one 10-micron filter element 554 positioned therein for removing particles entrained in the lubricant. Still more preferred is a dual filter assembly 546, as shown, having two 10-micron filter elements 554 positioned within filter assembly 546. A dual filter assembly 546 is preferred as it permits filter elements to be changed without shutdown of the lubrication system and gear set. A particularly preferred dual full-flow 10-micron filter assembly is available from Parker Co. (Part No. DIL2-2-10B-PM-35-YEYE-11). Gauges may be mounted as shown in FIG. 1 so that filter pressure drops can be monitored. Filter assembly outlet 552 is connected to second lubricant return line 560, which itself is in fluid communication with reservoir return port 516 of reservoir 512.

In a particularly preferred embodiment, a recovery reservoir 708 can be provided in first lubricant return line 592 to serve as a catch tank for lubricant draining back from the lower portion 608 of gear set cover 606. Recovery reservoir 608 can be sized within the range of about 20 to about 100 gallons, with a size of about 40 gallons being most preferred. Optionally, a low lubricant level alarm (not shown) can be installed in recovery reservoir 708 and wired into a safety shut-down system or visual or audible alarm system (not shown). Recovery reservoir 708 is provided with a supply port 709 to which lubricant return line 592 is connected thereto. Lubricant return line 592 is shown having a pump 798 installed after supply port 709 of recovery reservoir 708. Again, pump 798, while it may be an air operated, double diaphragm pump, such as Stewart-Warner Alemite Part No. 7061D-5-I, is preferred to be a screw-type pump of the type described above.

To remove metallic chips which may have become entrained within the lubricant being returned to recovery reservoir 708, an optional magnetic trap 722, such as is available from Kebby Company, can be mounted near return port 709 of recovery reservoir 708. Magnetic trap 722 is also useful for the monitoring of gear wear rates by plant personnel.

To address the concern that airborne plant dust and debris will accumulate within the open gear lubricant as it is recirculated, a 60–100 cfm shaded pole blower can be mounted above the lubricant level of reservoir 512 (as depicted in FIG. 1 for reservoir 12). It has also been found to be effective to mount a plurality of such blowers within the gear set cover 606. In operation, blowers 630 pull air through their respective fiber filters 631, pushing the air into the cover 606, providing a prevailing air pressure inside gear cover 606 somewhat above ambient. This higher level of pressure will tend to push airborne dust out of seals and fittings, rather than allow dirt and dust free entry. Suitable shaded pole blowers are available from W. W. Grainger, Inc. Filters 631 should be changed every two weeks or as required. Operating experience may dictate the use of a small rotary lobe blower with an air filter system of appropriate size in place of the shaded pole blower.

Particularly preferred lubricants for use in the practice of the present invention include the synthetic polyalpha olefin lubricants produced and marketed by the Mobil Oil Corporation of Fairfax, Va., including Mobil Gear SHC 3200 and Mobil Gear SHC 6800TM. Typical properties for Mobil Gear SHC and Mobil Gear SHC 6800TM are shown in Table 1, below.

TABLE 1

TYPICAL LUBRICANT PROPERTIES

| | 3200 | 6800 TM |
|---|---|---|
| Color | 0.5 | 1.5 |
| Specific Gravity | 0.890 | 0.890 |
| Pour Point °F.(°C.) | −4(−20) | 5(−15) |
| Flash Point °F.(°C.) Max. | 428(220) | 428(220) |
| Viscosity | | |
| cSt at 40° C. | 3,023 | 6,800 |
| cSt at 100° C. | 171 | 360 |
| SUS at 210° F. | 780 | 1,650 |
| Viscosity Index | 160+ | 160+ |
| ASTM Rust | Pass | Pass |
| Copper Corrosion | 1B | 1B |
| FZG Minimum Stages | 13 | 13 |
| Timken Ok-Load (Pounds) | 60 | 65 |
| Mobil Oxidation | | |
| (72 Hours - 163°) | | |
| VIS, Incorporated | 31.5% | 31.5% |
| N.N., Incorporated | 0.3 | 0.3 |
| 4 Ball Weld Load | 250 | 250 |
| 4 Ball Scar Diagram | 0.35 MM | 0.35 MM |

TABLE 1-continued

TYPICAL LUBRICANT PROPERTIES

| | 3200 | 6800 TM |
|---|---|---|
| Shear Stability | −15% | −15% |
| 200 Hour Roller Bearing Visual | | |
| L.W. Index | 50 Min. | 50 Min. |

The present invention is further illustrated by the following non-limiting example, which is presented for illustrative purposes only, and is not intended to limit the scope of the invention as defined by the appended claims.

EXAMPLE 1

This example demonstrates that an open gear set lubrication system built in accordance with the present invention and advantageously charged with the synthetic hydrocarbon lubricant described hereinbelow, produces significant benefits.

A recirculatory open gear lubrication system substantially similar to that depicted in FIG. 3, was built and installed in a cement plant having open gear sets to drive its mills and kilns. Since the use of the synthetic lubricant on open gears and gear covers that are coated with old asphaltic lubricant is known to slowly dissolve the coating, the interior surfaces of the gears and gear cover were thoroughly cleaned. The system was then charged with a synthetic polyalpha olefin lubricant material, produced by Mobil Oil Corporation of Fairfax, Va., and marketed as Mobil Gear SHC 3200. The synthetic lubricant had the properties shown in Table 2, below.

TABLE 2

| MOBIL GEAR SHC 3200 | |
|---|---|
| Color | 0.5 |
| Specific Gravity | 0.890 |
| Pour Point °F.(°C.) | −4(−20) |
| Flash Point °F.(°C.) Max. | 428(220) |
| Viscosity | |
| cSt at 40° C. | 3,023 |
| cSt at 100° C. | 171 |
| SUS at 210° F. | 780 |
| Viscosity Index | 160+ |
| ASTM Rust | Pass |
| Copper Corrosion | 1B |
| FZG Minimum Stages | 13 |
| Timken Ok-Load (Pounds) | 60 |
| Mobil Oxidation | |
| (72 hours - 163°) | |
| VIS, Incorporated | 31.5% |
| N.N., Incorporated | 0.3 |
| 4 Ball Weld Load | 250 |
| 4 Ball Scar Diagram | 0.35 MM |
| Shear Stability | −15% |
| 200 Hour Roller Bearing Visual | |
| L.W. Index | 50 Minutes |

As may be appreciated by those skilled in the art, the viscosity of the synthetic lubricant product, at 780 SUS at 210° F., is lower than the value specified by most open gear set builders (5,000–8,000 SUS at 210° F., without diluent). However due to the continuous application of the synthetic material using the recirculatory system of the present invention, a major improvement in lubrication is achieved over the periodic application of the heavier asphaltic material.

The synthetic lubricant charged to the system was pumped onto the open gear set, observed to drain to the bottom of the gear cover and was returned to the reservoir where it was subsequently filtered and pumped back onto the gear set.

Since the synthetic lubricant contains no solvents, black oils, or any other hazardous materials, leaked or spilled lubricant was cleaned up and disposed of in the same manner as other conventional lubricants.

The combination of the proven load-carrying ability of the synthetic lubricant, the recirculatory system's 10-micron filtration and continuous application of the lubricant is expected to dramatically reduce gear wear rates, reduce gear temperatures and reduce the power required to run typical mills and kilns. Temperature reductions of 15° to 20° F. were observed and power savings of 2–5% have been measured with the synthetic lubricant described above.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A recirculatory lubrication system for applying a film of lubricant to an open gear set having a pinion gear and a bull gear in meshing engagement with the pinion gear, the open gear set at least substantially enclosed by a gear set cover having a lower portion for collecting lubricant therein, comprising:
   (a) a lubricant reservoir having a lubricant supply port and a lubricant return port;
   (b) a lubricant supply line, said supply line having a first end in fluid communication with said supply port of said reservoir and a second end;
   (c) a lubricant distribution header having a first end and a second end, said first end of said header in fluid communication with said second end of said supply line, said header having a plurality of lubricant feed orifices positioned along the length of said header, said feed orifices effective in applying the film of lubricant onto the gear set;
   (d) a first lubricant return line having a first end and a second end, said first end in fluid communication with the lower portion of the gear set cover;
   (e) a filter assembly, said filter assembly including an inlet and an outlet, said inlet of said filter assembly in fluid communication with said second end of said first lubricant return line, said filter assembly having at least one filter element positioned therein for removing particles entrained in the lubricant;
   (f) a second lubricant return line having a first end and a second end, said first end in fluid communication with said outlet of said filter assembly and said second end in fluid communication with said lubricant return port of said reservoir;
   (g) a heater positioned within said reservoir to heat the lubricant within said reservoir; and
   (h) a blower in communication with said reservoir to raise the prevailing pressure within said reservoir above ambient pressure to prevent airborne dust from entering said reservoir and the open gear set during operation of the system.

2. The open gear set lubrication system of claim 1, further comprising an auxiliary lubrication system for gear mesh lubrication at the initiation of gear set rotation.

3. The open gear set lubrication system of claim 2, wherein said auxiliary lubrication system includes an auxiliary lubricant supply line having a first end in fluid communication with said lubricant supply line and a second end, the second end in fluid communication with a lubricant spray head, said spray head directed to spray lubricant across the gear mesh.

4. The open gear set lubrication system of claim 3, further comprising a pump in said auxiliary lubricant supply line of said auxiliary lubrication system.

5. The open gear set lubrication system of claim 4, further comprising a pump in said lubricant supply line.

6. The open gear set lubrication system of claim 1, further comprising a pump in said lubricant supply line.

7. The open gear set lubrication system of claim 5, further comprising a filter assembly in fluid communication with said lubricant supply line, said filter assembly including at least one filter element positioned therein for removing particles entrained in the lubricant.

8. The open gear set lubrication system of claim 1, further comprising a filter assembly in fluid communication with said lubricant supply line, said filter assembly including at least one filter element positioned therein for removing particles entrained in the lubricant.

9. The open gear set lubrication system of claim 1, further comprising at least one blower in communication with the interior of the gear set cover to raise the prevailing pressure within above ambient pressure to prevent airborne dust from entering the open gear set during operation of the system.

10. The open gear set lubrication system of claim 7, further comprising a magnetic trap positioned within said recovery reservoir to remove metallic particles entrained in the lubricant.

11. The open gear set lubrication system of claim 10, wherein said pumps are screw-type pumps.

* * * * *